United States Patent
Hewitt et al.

(10) Patent No.: US 8,248,472 B2
(45) Date of Patent: Aug. 21, 2012

(54) GREETING CARD INCORPORATING AN IMAGING DEVICE

(75) Inventors: Dominick Hewitt, Dublin (IE); Martin P. Kelly, Bray (IE)

(73) Assignee: Ardmore Greeting Limited, Ardmore Studios, Bray, County Wicklow (IE)

( * ) Notice: Subject to any disclaimer, the term of this patent is extended or adjusted under 35 U.S.C. 154(b) by 334 days.

(21) Appl. No.: 12/442,813

(22) PCT Filed: Sep. 25, 2007

(86) PCT No.: PCT/EP2007/060176
§ 371 (c)(1),
(2), (4) Date: Mar. 25, 2009

(87) PCT Pub. No.: WO2008/037722
PCT Pub. Date: Apr. 3, 2008

(65) Prior Publication Data
US 2010/0085421 A1    Apr. 8, 2010

(51) Int. Cl.
*H04N 7/18* (2006.01)
(52) U.S. Cl. .................................. 348/151; 348/158
(58) Field of Classification Search .............. 348/143, 348/151, 158
See application file for complete search history.

(56) References Cited

U.S. PATENT DOCUMENTS

| | | | | |
|---|---|---|---|---|
| 3,391,623 A * | 7/1968 | Tabankin | | 396/59 |
| 3,672,269 A * | 6/1972 | Tabankin | | 396/427 |
| 4,180,316 A * | 12/1979 | Della-Calce | | 396/263 |
| 4,525,047 A * | 6/1985 | Myers | | 396/265 |
| 4,703,573 A * | 11/1987 | Montgomery et al. | | 40/455 |
| 5,262,808 A * | 11/1993 | Mauchan | | 396/317 |
| 7,789,225 B2 * | 9/2010 | Whiteis | | 206/6.1 |
| 7,809,576 B2 * | 10/2010 | Lallouz et al. | | 704/271 |
| 2006/0134591 A1 | 6/2006 | Karat | | |
| 2008/0031607 A1 * | 2/2008 | Liao | | 396/59 |
| 2011/0197241 A1 * | 8/2011 | Creamer et al. | | 725/105 |

FOREIGN PATENT DOCUMENTS

| | | |
|---|---|---|
| GB | 2374230 | 10/2002 |
| GB | 2397274 A | 7/2004 |
| JP | 2003283895 | 10/2003 |
| JP | 2004147031 | 5/2004 |

* cited by examiner

*Primary Examiner* — Douglas Blair
(74) *Attorney, Agent, or Firm* — Mark S. Leonardo; Brown Rudnick LLP (57) ABSTRACT

The invention provides a greeting card having provided therein an imaging device, the imaging device being configured to capture an image, the capture of an image being controlled by operation of an activation means and a detection means. The activation means being operable on the detection means and is switchable by a user between a non-activated mode, and an activated mode. On adoption of the activated mode, a subsequent detection of the occurrence of a preset event by the detection means effects a corresponding issuance of a trigger signal, the trigger signal causing the capture of the image by the imaging device.

27 Claims, 7 Drawing Sheets

GREETING CARD INCORPORATING AN IMAGING DEVICE

FIELD OF THE INVENTION

The present invention relates to greeting cards and in particular a greeting card incorporating an integral imaging device for example, a camera.

BACKGROUND

People, even in today's high tech society, still gain enormous pleasure from receiving a personal greeting card, be it for a birthday, anniversary etc. A visit into any greeting card retail outlet gives the purchaser the option of buying a variety of cards. In addition to the traditional type of card having a written message, alternative types of multimedia cards, for example, cards which include a recorded voice message are also available.

Historically, and by their very nature, cards are used to communicate a message from the sender to the recipient. Cards are communicated most often by post, and the sender is usually remote from the recipient. Therefore, cards are largely seen as a one-way communication device without means for reciprocal communication.

In our society, which benefits from a variety of modes of communication other than post, and indeed a variety of multimedia communication means, users have ever increasing expectations of the types of communication they wish to use. There is therefore a demand for an improved type of card which utilises some of the alternative or complementary communication means available to users.

There are therefore a number of problems with conventional cards that need to be addressed.

SUMMARY

These needs and others are addressed by a greeting card in accordance with the teachings of the invention having provided therein an imaging device, the imaging device being configured to capture an image, the capture of an image being controlled by operation of an activation means and a detection means, wherein the activation means is operable on the detection means and is switchable by a user between a non-activated mode, and an activated mode wherein on adoption of the activated mode, a subsequent detection of the occurrence of a preset event by the detection means effects a corresponding issuance of a trigger signal, the trigger signal causing the capture of the image by the imaging device.

The invention therefore provides a greeting card as claimed in claim 1. Advantageous embodiments are provided in the dependent claims thereto.

According to another aspect the invention provides a greeting card in accordance with claim 24, the greeting card having an integrally formed camera therein, the camera being activated by an activator on sensing of a predetermined signal, wherein the activator is normally provided in an off condition where it will not activate the camera and is movable to an on position by a sender of the card, the movement to the on position ensuring that on subsequent sensing of the predetermined signal the camera will capture an image, and wherein a sending of an activated card by the sender to a recipient and the subsequent opening of the card by the recipient provides an activation of the activator and capture of an image by the camera, the captured image being that of the recipient of the card, with advantageous embodiments provided in the claims dependent thereto According to a further aspect the invention provides, in accordance with claim 26, an imaging device suitable for mounting concealed in an imaging device support the imaging device being configured to capture an image, the capture of an image being controlled by operation of an activation means and a detection means, wherein the activation means is operable on the detection means and is switchable by a user between a non-activated mode, and an activated mode, wherein on adoption of the activated mode, a subsequent detection of the occurrence of a preset event by the detection means effects a corresponding issuance of a trigger signal, the trigger signal causing the capture of the image by the imaging device. Advantageous embodiments provided in the claims dependent thereto.

The invention further provides method for use of a greeting card of the invention as claimed in 28.

These and other features of the invention will be better understood with reference to the exemplary embodiments which are described hereinafter with reference to the following drawings.

BRIEF DESCRIPTION OF THE DRAWINGS

The present invention will now be described with reference to the accompanying drawings in which.

DETAILED DESCRIPTION OF THE DRAWINGS

Figure 1:
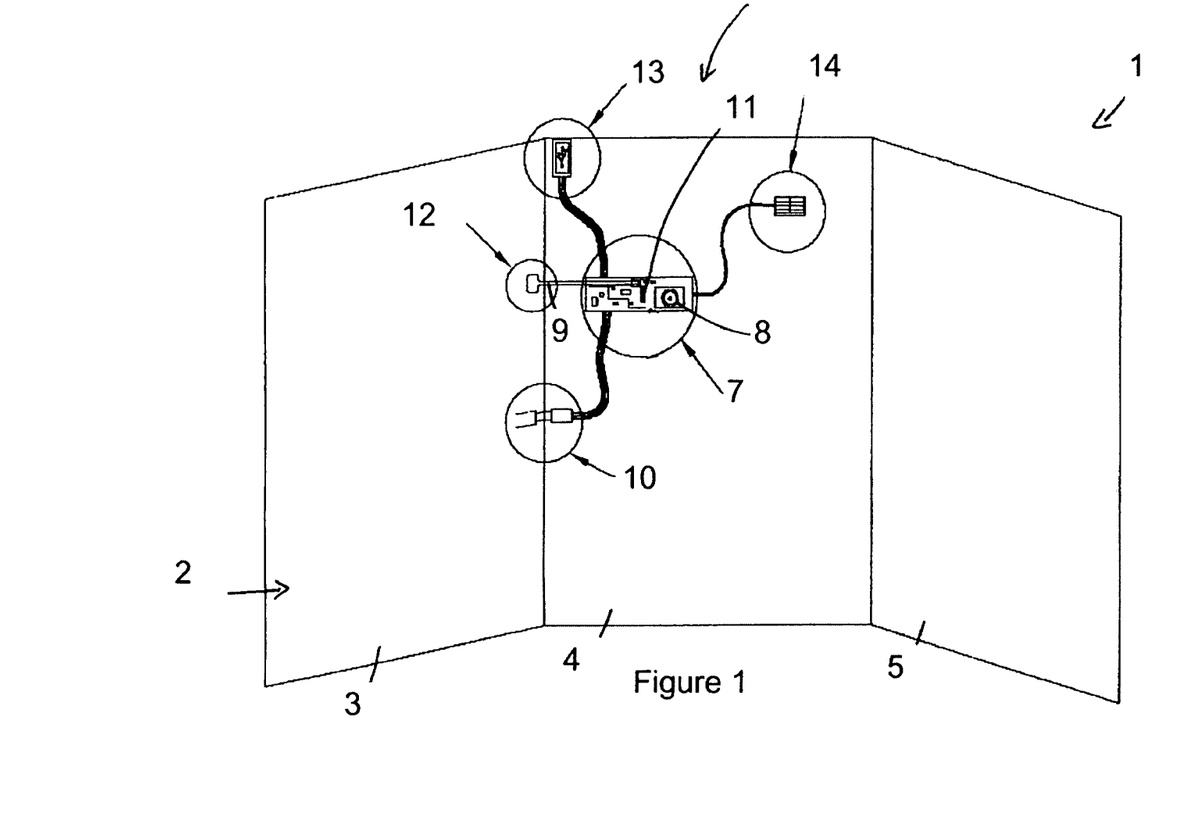
FIG. 1 is a plan view from the back or inside of a greeting card device according to the invention.
Figure 2:
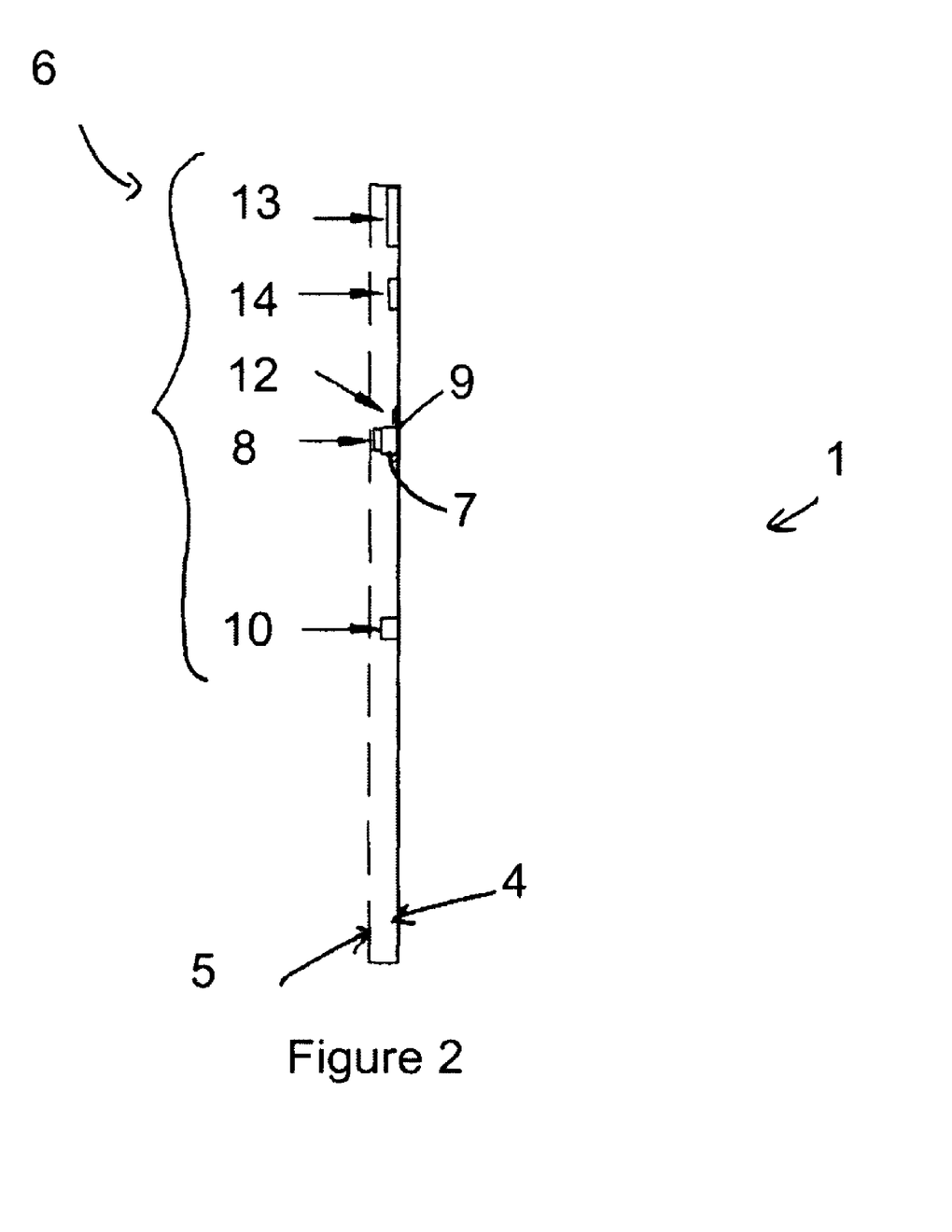
FIG. 2 is a side view.
Figure 3:
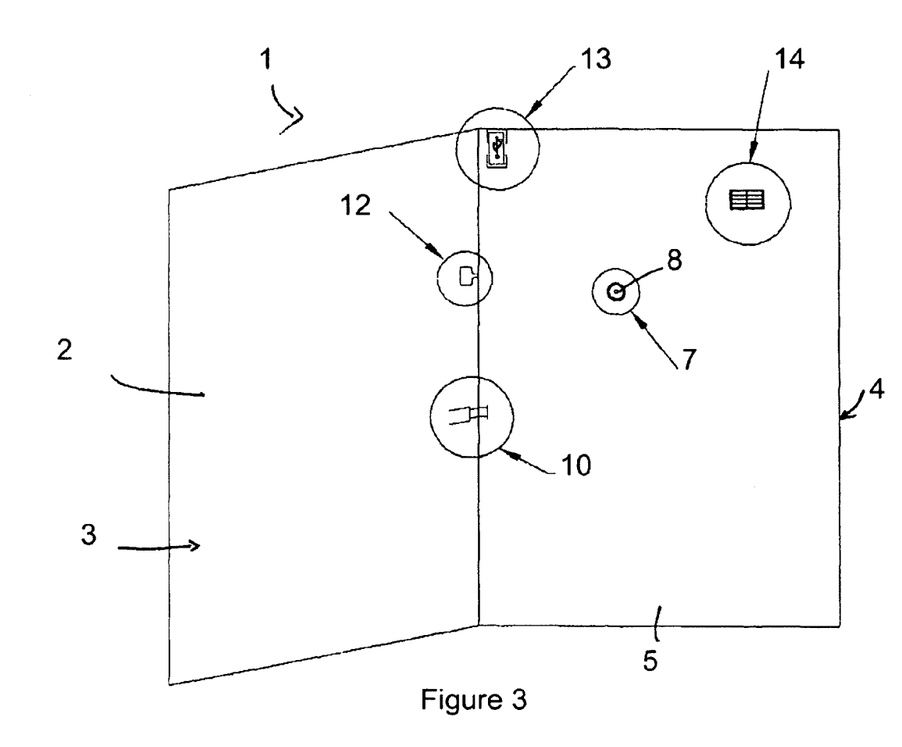
FIG. 3 is a partially cutaway plan view from the front or outside of the device of FIG. 1.

Referring to the drawings and initially FIGS. 1 to 3, a greeting card device 1, according to an exemplary embodiment of the invention, comprises a card 2 having provided therein an imaging device 6. The imaging device 6 comprises a camera 7, a lens 8, an activation means 9, and a detection means 10. The imaging device further includes a data storage means 11, a power source (not shown) and a safety tab 12.

The camera 7 is a miniaturised camera, which is mountable as a hidden camera within or to the card 2. The camera 7 may be a digital still camera or a camera comprising means for taking a digital still photograph.

The imaging device 6 is suitable for mounting concealed in an imaging device support. In this illustrated embodiment, the imaging device support comprises the greeting card which is a two leaf card formed from three leaves 3, 4 and 5. The components of the imaging device 6 are fixed to the second central leaf 4 of the card 2, and the third leaf 5 is foldable over onto the central leaf 4 and fixable thereto so that the camera is effectively hidden between the two leafs 5 and 4. The leaf 5 comprises a window for the camera lens 8, as shown (FIG. 3), so that the lens is exposed to the inside of the card when the card is opened. The imaging device is light and compact in form.

The capture of an image by the imaging device is controlled by operation of the activation means 9 and the detection means 10. The activation means is operable on the detection means and is switchable by a user between a non-activated mode, and an activated mode. On adoption of the activated mode, a subsequent detection of the occurrence of a preset event by the detection means 10 effects a corresponding issuance of a trigger signal, the trigger signal causing the capture of the image by the imaging device.

In this case, the activation means 9 is set to the activated mode by removing the safety tab 12 and the detection means is configured to detect the preset event of the card being opened.

The detection means 10 is configured to output a trigger signal upon detection of a preset condition. The detection means 10 may for example, comprise a mechanical trigger, a pressure sensitive pad, or a photosensitive sensor configured to detect when the card has been opened by a change in the light detected.

The activation means 9 may further comprise a timer configurable to start running when the trigger signal is issued. The timer may be settable to delay the image capture for a set period of time for example 10 seconds after it is detected that the card has been opened. The timer may include a number of different time delay settings which may be selected by the sender for example via a small dial within the card.

When the activation means 9 is set to a non activated mode no images are automatically captured even if the detection means detects a preset condition or the trigger is activated.

In addition, the detection means 10 may be configured to detect an alternative preset event or condition. The activation means may alternatively, or in addition comprise other suitable detection means. For example a photosensitive cell, which may detect the event that the card has been removed from an envelope, and issue a trigger signal to the imaging device.

The position of the lens on the card is carefully selected to ensure that the lens 8 will be positioned correctly relative to the card so that an image may be captured as required.

The imaging device may further include a communications interface 13 to enable the images captured and stored thereon to be transferred to another storage device. The communications interface 13 may comprise a USB interface or a wireless communication means such as, a blue tooth or fire wire communication means. An image captured by the imaging device is stored in the data storage means 11 and may be transferred via the communications interface to a computer or other communication device. The communications interface may be integral with the imaging device 6 or connectable thereto.

The imaging device power source may be a battery, for example, a rechargeable battery. The device may further comprise a solar cell built into the card to facilitate the recharge. Alternatively the imaging device may be powered by a solar cell.

The imaging device 6 may further comprise a flash 14, for example, an LED flash. The flash may be powered by an additional power source or the same power source as the imaging device. The imaging device 6 may further comprise a light meter configured to read the level of available light in the given environment before the card is opened and to provide a signal output to the flash if it is to be activated.

The imaging device may also be useable as a web cam. While in the foregoing description, the imaging device is used to capture an image it will be appreciated that it may be set and used to capture a plurality of images as required, for example number of images at intervals of time.

While the greeting card having an imaging device described above is configurable to capture an image on the event of the opening of the card, it may also have means to enable an image to be captured directly by the user as required.

Figure 4:
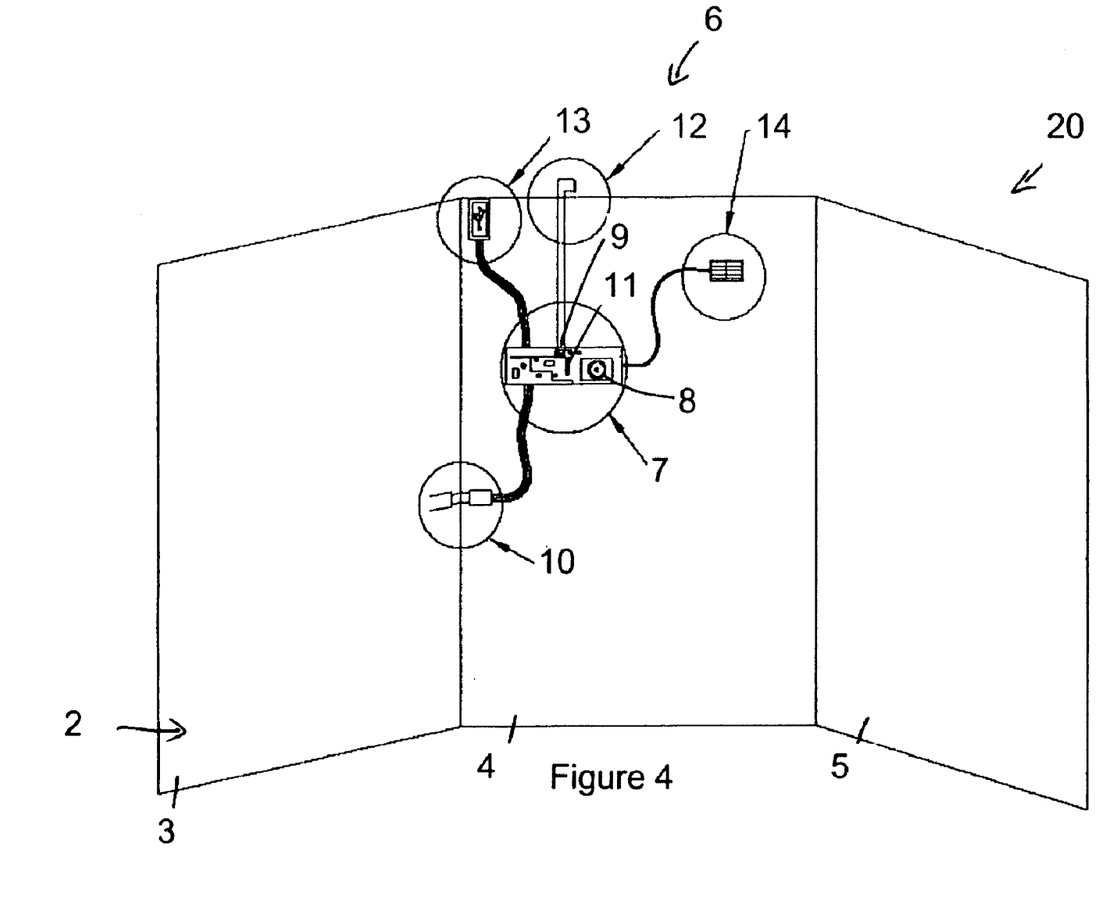
FIG. 4 is a plan view from the back or inside of an alternative greeting card device according to the invention.
Figure 5:
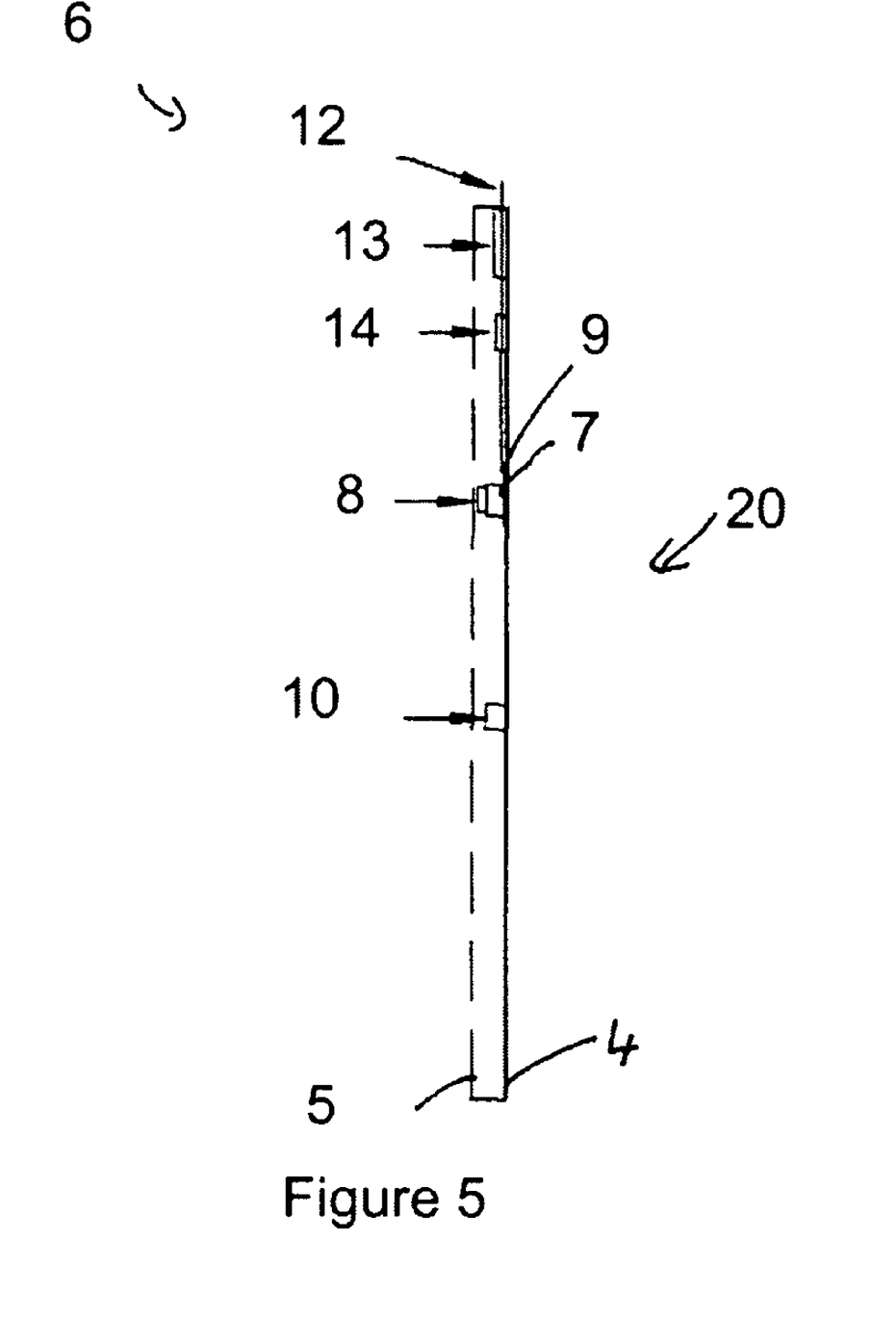
FIG. 5 is a side view.
Figure 6:
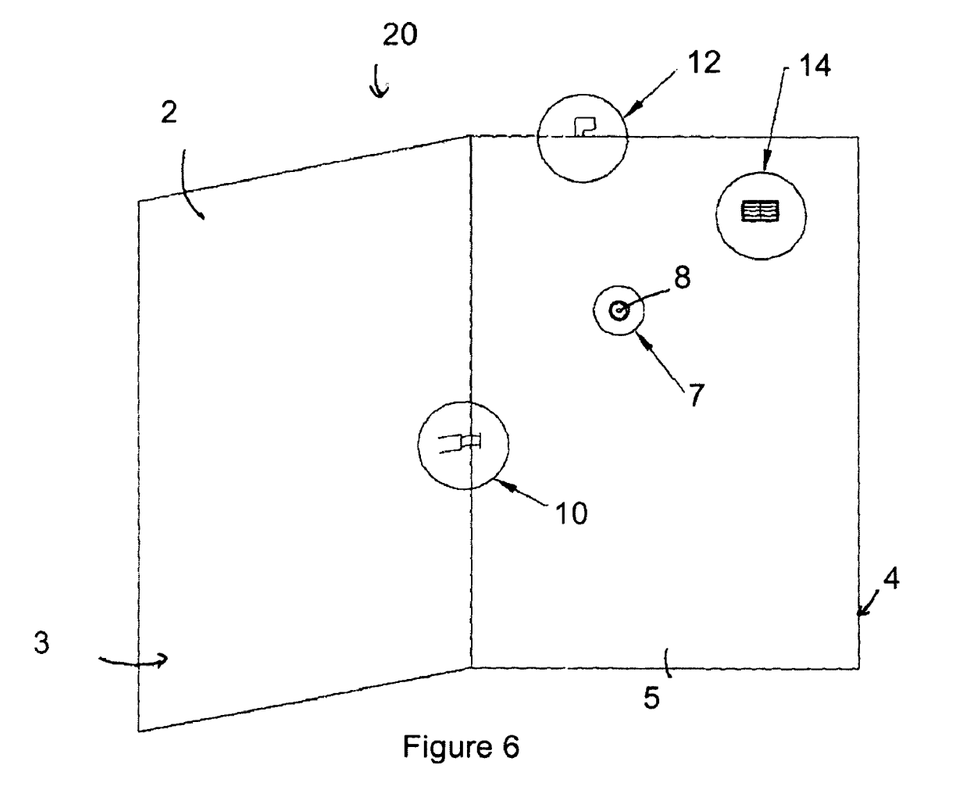
FIG. 6 is a partially cutaway plan view from the front or outside of the device of FIG. 4.

Referring to FIGS. 4 to 6 a card device 20 incorporating an imaging device according to an alternative embodiment of the invention is described. The card device 20 is similar to the card 1 incorporating an imaging device and in the drawings the same reference numerals have been used to indicate similar components. In the case of the device 20 there is an alternative arrangement of the safety tab 12 which in this case is located to the top portion of the card. It will be appreciated that the safety tab may be located at any suitable point on the card. Location at the top portion of the card enables ease of access for the sender for example, when they have finally prepared the card for sending it and closed it for the last time.

Figure 7:
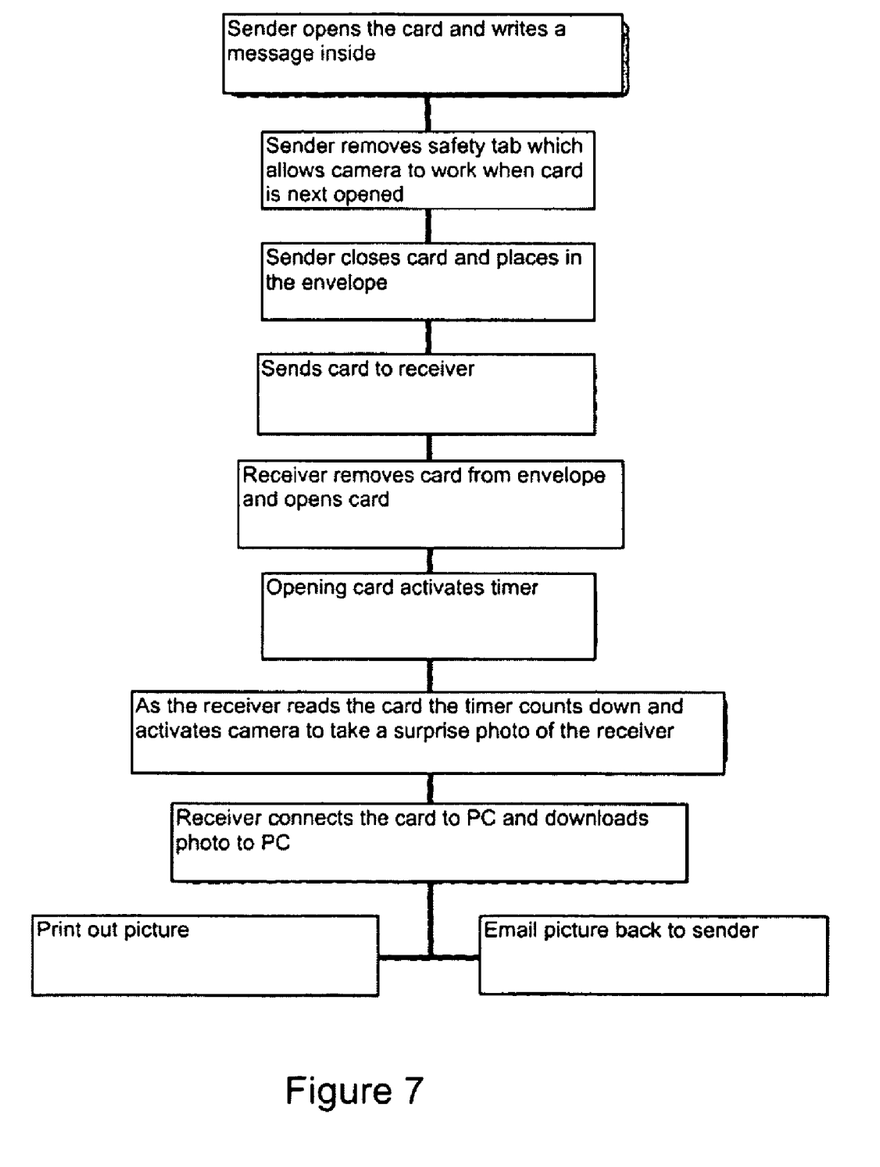
FIG. 7 is a flow chart showing the steps of operation of the devices of FIG. 1 and FIG. 4.

Referring to FIG. 7 the steps of a method of use of the greeting card device 1 or 20 of the invention are described. The method of use includes the setting up of the card by the sender, and the steps of retrieving the images from the data store on the card, for example, as follows:

A. The sender takes the card, which is initially set in the non-activated mode.

B. The sender prepares the card for sending for example, by writing a greeting message prior to sending the card.

C. When the card has been prepared for sending, the sender uses (for example, by removing the safety tab) the activation means to activate the card to the activated mode (so that an image will be automatically captured on receipt of a trigger signal). In this example, the device is set so that a trigger signal will be issued when it is detected that the card is being opened.

D. The activated card is sent to the receiver.

E. The receiver opens the card, this triggers the device.

F. An image is captured of the receiver on opening the card.

G. An image is stored in the data storage means.

H. The receiver of the card downloads the image to a computer by plugging a USB cable into imaging device and downloading the card to the computer.

The image can then be stored, viewed, sent, or edited.

The imaging device within the card may also include imaging software and templates for many different occasions (e.g. weddings, birthdays, get well cards). The imaging device may further comprise means to enable the sender to capture an image and store it for viewing by the receiver. If there are multiple senders this will enable them to write a greeting and take a picture to be viewed later by the receiver.

The lens may comprise a wide angle lens to facilitate the required image being captured at different angles. The imaging device may comprise a subject recognition means as a detection means.

The imaging device may incorporate a zoom lens. The card may incorporate sound effects when a picture is taken.

The imaging device may also be on the outside of the card.

The images taken by the imaging device could be transferred via Bluetooth, USB, Fire-Wire or other communication means to a mobile communication device or other computing system.

The card may also comprise means for instantly printing any image taken by the camera. The card may further comprise means for displaying images taken by the camera via LCD or other image display systems screen, or screens located within the card.

The card may also comprise means to enable the sender to store their personal information e.g. phone number and email address on the software within the card to facilitate the receiver access for the transportation of images to the assigned destination. The senders personal information could be shown or hidden to the receiver (in the case of a Valentines day card the senders identity remains hidden). Similarly the sender may use the card to send a downloadable image stored in the imaging device software, that can be viewed by the receiver. The sender may also have the option to upload music and his own personal templates to the card software before sending.

While in the embodiments described the imaging device of the invention is mounted between two leaves of a three leaf card, it will be appreciated that it may be mounted on any suitable alternative arrangement, for example the card may comprise just two leaves and the camera is mountable between them.

While in the embodiments described the imaging device is mounted such that the lens points to the inside of the card, it may alternatively point to the front or back of the card. Alternatively, the card or the imaging device of the invention may be incorporated into any other item that can be folded and reopened e.g. promotional materials and catering packaging.

The greeting card device of the invention has the advantage that it provides means for a two way communication between the card recipient and the sender. The card of the invention is very flexible and may be used in a variety of ways by users.

While the invention has been described with reference to preferred embodiments it will be understood by the person skilled in the art that modifications can be made to the described embodiment without departing from the spirit and scope of the invention. In this way the invention is not intended to be limited in any fashion except as may be deemed necessary in the light of the appended claims.

The words comprises/comprising when used in this specification are to specify the presence of stated features, integers, steps or components but does not preclude the presence or addition of one or more other features, integers, steps, components or groups thereof.

The invention claimed is:

1. A greeting card comprising:
a first leaf and a second leaf, and
an imaging device integrally mounted to the card, the imaging device comprising:
  an activator device comprising a tab,
  a camera mounted between the first leaf and the second leaf, and
  a detector device comprising a trigger,
wherein the first or second leaf comprises a window for receiving a lens of the camera,
the activator device is operably coupled to the detector device and is switchable by a user between a non-activated mode and an activated mode, and
the detector device is configured to, while in the activated mode, detect a preset event and respond to the detection by issuing a trigger signal, thereby causing the camera to capture an image.

2. The card of claim 1, wherein the imaging device is mounted concealed in said card.

3. A card as claimed in claim 1, wherein the preset event is the card being opened.

4. A card as claimed in claim 1, wherein the preset event comprises the card being removed from an envelope.

5. A card as claimed in claim 1, wherein the trigger of the detector device comprises a mechanical trigger.

6. A card as claimed in claim 1, wherein the trigger of the detector device comprises a photosensitive detector.

7. A card as claimed in claim 1, wherein the activator device further comprises a timer.

8. The card of claim 7 wherein the timer comprises means for setting a time delay to delay the capturing of the image for a preset time after issuance of the trigger signal.

9. The card of claim 1 wherein the camera comprises a wide angle lens.

10. A card as claimed in claim 1, wherein the imaging device comprises a wireless data communication means.

11. A card as claimed in claim 1, wherein the card comprises a USB port.

12. The card of claim 1 further comprising a data storage means configured to store the captured image and a data communication means to enable a subsequent communication of the captured image.

13. The card of claim 1, further comprising a flash.

14. The card of claim 13 further comprising a light meter, wherein the light meter is configured to output data on ambient light levels to the flash.

15. The card of claim 1, wherein the imaging device further comprises a solar cell power supply.

16. A greeting card comprising:
a first leaf;
a second leaf connected to the first leaf; and
an imaging device integrally mounted to the greeting card, wherein the imaging device comprises a camera, a detector device, and an activator device, wherein the activator device is configured to allow a user to switch the imaging device between a non-activated mode and an activated mode and further wherein the detector device is configured to, when the imaging device is in the activated mode, cause, responsive to a trigger signal, the imaging device to capture an image, and further wherein the first leaf comprises a window for receiving a lens of the camera.

17. The greeting card of claim 16, wherein the camera is mounted between the first leaf and the second leaf 18. The greeting card of claim 16 further comprising a third leaf.

19. The greeting card of claim 6, further comprising means for storage of personal information of a sender.

20. The greeting card of claim 19, further wherein the personal information is hidden from a recipient.

21. A greeting card comprising:
a first leaf;
a second leaf connected to the first leaf; and
an imaging device integrally mounted to the greeting card, wherein the imaging device comprises:
  a camera,
  a detection device, and
  an activation device comprising a safety tab removably coupled thereto,
wherein the activation device is configured to allow a user to switch the imaging device between a non-activated mode and an activated mode and
the detection means is configured to, when the imaging device is in the activated mode, cause, responsive to a trigger signal, the imaging device to capture an image.

22. A greeting card comprising:
a first leaf;
a second leaf; and
an imaging device integrally mounted to the card and comprising:
  a camera mounted between the first and second leaf, and
  a tab coupled to a detector device,
wherein the first leaf comprises a window for receiving a lens of the camera,
the imaging device is switchable by a user from a non-activated mode to an activated mode through the use of the tab, and
the detector device is configured to, if in the activated mode, detect a preset event and respond to the detection by issuing a trigger signal that causes the camera to capture an image.

23. The card of claim 22, wherein use of the tab comprises removing the tab.

24. The card of claim 23, wherein the detector device comprises one selected from the list consisting of: a photosensitive sensor, a pressure sensitive pad, and a mechanical trigger.

25. A greeting card comprising:
a first leaf;
a second leaf; and
an imaging device integrally mounted to the card and comprising:
a camera mounted between the first and second leaf, and
an activator operably coupled to a pressure sensitive pad,
wherein the first leaf comprises a window for receiving the lens of the camera,
the imaging device is switchable by a user from a non-activated mode to an activated mode through the use of the activator, and
the pressure sensitive pad is configured to, if in the activated mode, detect a preset event and respond to the detection by issuing a trigger signal that causes the camera to capture an image.

26. The card of claim 25, wherein the preset event is the card being opened.

27. The card of claim 26, wherein the activator comprises a safety tab.

* * * * *